US012670131B2

(12) United States Patent
Lazar

(10) Patent No.: US 12,670,131 B2
(45) Date of Patent: Jun. 30, 2026

(54) COMPUTER-IMPLEMENTED DATABASE METHOD FOR STORING BASIC DATA IN DATA TABLE

(71) Applicant: Swedex Holding GmbH, Neuss (DE)

(72) Inventor: Andreas Lazar, Neuss (DE)

(73) Assignee: Swedex Holding GmbH, Neuss (DE)

( * ) Notice: Subject to any disclaimer, the term of this patent is extended or adjusted under 35 U.S.C. 154(b) by 0 days.

(21) Appl. No.: 18/692,478

(22) PCT Filed: Sep. 16, 2022

(86) PCT No.: PCT/EP2022/075744
§ 371 (c)(1),
(2) Date: Mar. 15, 2024

(87) PCT Pub. No.: WO2023/041692
PCT Pub. Date: Mar. 23, 2023

(65) Prior Publication Data
US 2025/0124007 A1 Apr. 17, 2025

(30) Foreign Application Priority Data
Sep. 16, 2021 (DE) .......................... 102021123997.4

(51) Int. Cl.
*G06F 16/21* (2019.01)
*G06F 16/22* (2019.01)
(52) U.S. Cl.
CPC .......... *G06F 16/211* (2019.01); *G06F 16/221* (2019.01)

(58) Field of Classification Search
CPC ............................ G06F 16/211; G06F 16/221
See application file for complete search history.

(56) References Cited

U.S. PATENT DOCUMENTS 5,560,005 A * 9/1996 Hoover ................. G06F 16/245
2007/0136662 A1* 6/2007 Khaba ................... G06F 40/166
715/202

(Continued)

OTHER PUBLICATIONS

Peterson Don: "Lookup Table Madness", sqlservercentral, Mar. 24, 2006, pp. 1-5, XP093001436, retrieved from the Internet: https:/ /www .sqlservercentral.com/articles/lookup-table-madness.

(Continued)

*Primary Examiner* — William P Bartlett
(74) *Attorney, Agent, or Firm* — CALDERON SAFRAN & WRIGHT P.C.

(57) ABSTRACT

A computer-implemented database method stores items of basic data in a multi-column and multi-row data table of a database. At least one dimension from at least some fields is assigned to the items of basic data, the at least one dimension indicating that these items of basic data are related to one another, and are provided by means of translations into different languages and/or by means of different representations for different places of business. The or each dimension is assigned to the or each concerned item of basic data by storing dimension JDs in those rows in which the fields of the or each concerned item of basic data are located. In another column, dimension column, which is not a data column and which is provided for the assignment of the or each dimension, dimension IDs belonging to the same dimension differ from each other.

16 Claims, 3 Drawing Sheets

(56)             References Cited

U.S. PATENT DOCUMENTS

| | | | | |
|---|---|---|---|---|
| 2011/0295837 A1* | 12/2011 | Bolsius | ............... | G06F 16/245 |
| | | | | 707/E17.017 |
| 2022/0129456 A1* | 4/2022 | Conradi | ............... | G06F 16/248 |

OTHER PUBLICATIONS

Sen Anith: "Five Simple Database Design Errors You Should Avoid", red-gate, Oct. 16, 2009, pp. 1-14, XP093001439, retrieved from the Internet: https://www.red.gate.com/simple-talk/databases/sql-server/ database-administration-sql-server/five-simple.database-design-errors-you-should-avoid.
International Preliminary Report on Patentability from Corresponding PCT Application No. PCT/EP2022/075744 dated Mar. 28, 2024.

* cited by examiner

FIG. 1 -- Prior Art --

COMPUTER-IMPLEMENTED DATABASE METHOD FOR STORING BASIC DATA IN DATA TABLE

CROSS-REFERENCE TO RELATED APPLICATIONS AND CLAIM TO PRIORITY

This application is a national stage of International Application No. PCT/EP2022/075744 filed Sep. 16, 2022, which claims priority to German Patent Application No. 10 2021 123 997.4 filed Sep. 16, 2021, the disclosures of which are incorporated herein by reference and to which priority is claimed.

FIELD OF THE INVENTION

The invention relates to a computer-implemented database method. Furthermore, the invention relates to a system for data processing, a computer program product and a computer-readable storage medium.

BACKGROUND OF THE INVENTION

Database methods relating to the storage, management and/or retrieval of data in databases are already known from the state of the art. For example, companies store information about their customers, cooperation partners, orders, inventory, items offered, order status, etc. in databases.

In databases, data can in particular be stored in the fields of multi-row and multi-column tables. For example, data relating to the customers of a company are or will be stored in a table. In the first column, for example, an identifier assigned to the respective customer, e.g. an ID, may be stored and in the following columns first name, surname, telephone number, address, etc. In the first row of each column, the attributes (ID, first name, last name, . . . ) can be named as a headline and in the rows below, the information belonging to one customer in each row. If it is necessary to store data on products, stock, order status etc. it is possible to proceed completely analogous.

In some cases, there is a need to store additional data for one or more entries in the field(s) of a database table that are related to the or the respective entry. For example, a global or integrated database is required for a company with several subsidiaries in different countries and the data for all subsidiaries should be available in a suitable form. It may then be necessary, for example, to store an item name not just in one but in several languages so that it is available in the database for example in French for a subsidiary for example in France and for example in English for a subsidiary in the United Kingdom.

The applicant knows that additional tables including the translations have so far been created for this purpose. For example, in a table containing data on the items of a company, the item name "Livre" is stored in French because the parent company is based in France. If an English-speaking subsidiary is to be able to use the database just as easily, a separate table is created to store the English translation "Book" of the item name, which is set in relation to the original French-language table.

This solution is static. A specific database and various tables must be created for each project that covers several different language subsidiaries, for example, and the references of the tables (also known as "relations") must be created. It is also necessary to create a specific query, e.g. SQL script query, as the names of the translation tables and the field names do not match.

If a project for a company shall cover several subsidiaries and all data for all subsidiaries is to be stored in a database in order to obtain an integrated system, there is the problem that the database becomes comparatively complex and requires comparatively many queries in order to obtain the desired result. The query time can therefore be high.

SUMMARY OF THE INVENTION

Therefore, it is a task of the present invention to provide a computer-implemented database method which is characterized by high efficiency, which is associated with comparatively low complexity and which enables retrieval of stored data with moderate effort.

This task is solved by a computer-implemented database method in which basic data to be stored are stored in a multi-column and multi-row data table of a database in data columns provided for this purpose, at least one dimension is assigned to the basic data of at least some fields, the at least one dimension indicating that this basic data are related to one another, in particular are given by translations into different languages and/or by different representations for different subsidiaries, wherein the assignment of the or the respective dimension to the or the respective affected basic data takes place by storing dimension IDs belonging to the or the respective dimension in those rows in which the fields of the or the respective affected basic data are located, in another column which is not a data column and which is provided for the assignment of the or the respective dimension, dimension column, wherein dimension IDs belonging to the same dimension differ from one another.

In other words, data records can be efficiently dimensioned according to the present invention. Data records no longer have to be divided into several tables in order to relate them to a specific data record and then joined together again for the query, in particular with JOINs, i.e. (SQL) commands for merging data from different tables. Instead of a relational storage (normal form), a table using one or more dimensions can be used according to the invention.

One could also say that a dimension or the dimensions are used according to the invention in order to be able to store information or a piece of information under different aspects or in different characteristics. Different basic data belonging to a dimension can therefore in particular be different characteristics or aspects of the same information.

An example of basic data with a common dimension is given by translations of an expression into different languages, for example translations of the name of an item into different languages, such as "book", "Buch" and "livre". Each of these three basic data entries is stored in the same table, the data table, and each of these three basic data entries is assigned a dimension ID and stored in the corresponding field of the dimension column. The three dimension IDs assigned to these three different translations differ from each other.

Dimension IDs can be given for example, in a manner known per se, by numbers or alphanumeric sequences. The three basic data entries "book", "Buch" and "livre" could, for example, be assigned the numbers 5000, 5001 and 5002 as dimension IDs and stored in the dimension column, whereby this is to be understood purely as an example and other numbers, alphanumeric sequences or identifiers of a completely different kind can of course also be used. The only requirement is that dimension IDs belonging to one dimension are different in order to take into account the different characteristics, for example the different languages.

The exemplarily described dimension enabling several translations can for example be assigned the name "Language".

In addition to the aspect of translations into different languages, a dimension provided according to the invention can of course also regard another relationship between basic data. By way of example only, it may be mentioned that the database comprises or is to comprise basic data for several subsidiaries of a company. In this case, the dimension "Subsidiary" can be provided as an alternative or in addition to the dimension "Language". If there are several subsidiaries, it may be that the same item is sold by the different subsidiaries at different prices, for example in different currencies and/or for different amounts in the same or different currencies. According to the invention, the different prices for the same item can be stored in a table with the dimension "Subsidiary", whereby the different prices are in turn assigned dimension IDs, which in turn belong to the dimension "Subsidiary". Another example of a dimension is "Country", if basic data belonging to different countries is to be stored.

The different aspects or characteristics of a dimension, e.g. the different translations in the case of the "Language" dimension or the different prices of the "Subsidiary" dimension, can also be understood and described as dimension branches. It can then also be said that each dimension branch is assigned its own dimension ID.

In a preferred further development it is stored in the data table which meaning which dimension branch has, particularly preferably in a respective own row of the data table. For example, a data table for a dimension "Language" with the dimension branches "German" and "English" can have two rows containing the respective information "German" and "English". It is then particularly advantageous if a unique ID assigned to the respective row, in particular a MasterRecordID assigned to the row, is used as the dimension ID for the respective dimension branch.

The storage of interrelated data or data representing different aspects or characteristics of information in a table and the associated use of the dimension(s) according to the invention offers considerable advantages. In particular, if the same table is used, it is not necessary to generate several script queries in order to obtain results from the database. A dynamic script generator can be used. The query can be accelerated many times over. As a result, (computing) time, effort and also energy can be saved. The method according to the invention therefore is particularly sustainable.

Advantageously, all basic data to be saved are stored in one table, the data table.

Multiple basic data from a data column to which the same dimension is assigned conveniently are stored in adjacent or consecutive fields of the respective data column. Dimension IDs associated with basic data conveniently are stored in those fields of the dimension column that lie in the same rows as the respective basic data.

It can also be said that, according to the invention, one or more data sets are obtained or stored that have several different dimensions or dimension branches, which are stored in columns by use of dimension references. For the dimension data, further rows are formed in the same table, the data table, which contain dimension data for columns of a dimension.

Within the framework of the database method according to the invention storage, management and/or retrieval of data in digital form can in particular take place.

Basic data in particular are the data to be stored and managed by means of the database. This data can, for example, be provided by at least one user of the database, for example by use of at least one suitable user interface. Customer data as well as item or service and order data of one or more companies are mentioned by way of example as basic data.

In addition to basic data, additional data is usually stored in the table(s), which is used for database internal data management or queries, for example. An example of additional data is identifiers, or IDs for short, which are assigned to entries to make them easier to find.

In a particularly expedient embodiment, for data column fields with basic data to which a dimension is assigned, it applies that in other data columns which are provided for basic data to which this dimension is not assigned, the fields in the same row remain empty or comprise empty entries, in particular the specification NULL. The corresponding rows may contain nothing at all or an entry indicating that there is no data content, for example the expression "NULL" in the corresponding fields. In other words, columns of a row that do not belong to its dimension remain empty or are displayed as empty. In particular, this makes it possible to subsequently combine or query data using the MAX( ) function. The MAX( ) function is preferably a known function that outputs the largest value, i.e. the maximum, of a selected column. If the data query can be carried out using the MAX( ) function, query time can be saved to a considerable extent, particularly in comparison with queries of data that is distributed across several tables and for which the JOIN function must be used.

In a further advantageous embodiment, for data column fields with basic data to which no dimension is assigned, it applies that no dimension IDs are stored in the dimension column in the fields in the same row, but these in particular remain empty or comprise empty entries, in particular the specification NULL. This is a particularly suitable way of distinguishing between basic data with and basic data without a dimension.

It has also proven to be particularly useful if a matching master ID is assigned to a plurality of basic data, in particular those being stored in different rows of the data table. It can also be said that the multiple basic data then refer to the master ID or one master record. If this is the case, the master ID is preferably stored in those rows of the data table in which the fields of the or the respective concerned basic data are located, but in another column that is not a data column, the master ID column.

It is particularly preferable that each row in the data table is assigned an ID, whereby the IDs of all rows in the data table differ from each other. In this case they are—at least within the data table—unique. For example, it has proven to be particularly suitable to assign consecutive numbers to the rows of the data table, e.g. ID "1" to the first row, ID "2" to the second row and so on. Of course, it is not necessary to start with "1", but any other number can be selected as the starting point for the first row. Such IDs, which can also be referred to as row IDs, particularly preferably are stored in the first column of the data table, which can then also be referred to as the ID column or row ID column.

Such row IDs can be globally unique IDs. Such IDs are also referred to as GUIDs, whereby the abbreviation GUID stands for globally unique identifier. They can also be so-called MasterRecordIDs.

It should be noted that the term columns of a table sometimes refers to the adjacent fields in the vertical direction and the term rows of a table to the adjacent fields in the horizontal direction. This restriction does not apply here. Rather, the orientation can also be reversed. In other words, the columns of a table, for example a data table, can also be horizontally oriented columns, while the rows are oriented vertically. This is completely irrelevant for storage. There is no "preferred orientation". However, if presently columns on the one hand and rows on the other are mentioned, this should be understood in such a way that their orientation differs, i.e. either the columns are vertical while the rows are horizontal, or the columns are horizontal and the rows are vertical.

Another particularly advantageous embodiment is furthermore characterized in that information about the dimension or, in case of several dimensions, the respective dimension is stored in a further table. Such a table is presently referred to as an object table. The object table then preferably comprises an ID column in which an ID associated with the or the respective dimension is listed. This ID can also be referred to as the higher-level ID of the or the respective dimension. Higher-level, as there are several different dimension IDs for each dimension. The higher-level dimension ID can also be referred to as the dimension master ID. In this case, the dimension master ID is a unique identifier assigned to the (respective) dimension and the dimension leads to several entries, one for each of the different dimension IDs.

If an object table exists, it can furthermore have a name column in which a name assigned to the or the respective dimension is listed. The dimension names can be, for example, "Language", "Subsidiary" and/or "Country", as mentioned above. In this case, it is immediately apparent which aspects the respective dimension relates to.

It is also preferable for the object table to have an object dimension ID column. Using this field or the fields in this column, it is possible to assign a dimension directly to an object, such as a business object. If this is the case, it is not necessary to configure individual fields with a dimension, but all fields of the object have a dimension that is inherited from the object.

There may also be further columns present in the object table, e.g. those relating to authorizations and/or instances, e.g. for several customers, and/or creation or update times and the like.

Preferably, objects are stored in the database, wherein the basic data from one or more fields from one or more data columns of the data table belong to each object, and wherein an object ID is assigned to each object.

An object is in particular to be understood as a collection of related data that is or will be stored in the database, preferably in a table format. Particularly in the event that the database is used by one or more companies, one can also speak of business objects, abbreviated as BOs. A collection of data belonging to a specific item or a collection of data from a customer account are examples of an object or business object.

If data for at least one object is or will be stored in several rows in the data table, it is further preferred that a matching master ID is or will be assigned to several of these rows. Several rows with a matching MasterRecordID are in particular regarded as a related data record. One data record or several data records can belong to one object.

The (respectively) matching master ID preferably is stored in a master ID column of the data table in the corresponding rows belonging to the object or data record of the object.

If unique row IDs, e.g. consecutive row IDs, preferably being located in the first row of the data table or being stored there, are assigned to the rows of the data table, it is particularly preferable that the row ID located in the first row of the respective object or the respective data record, in other words in the master row of the respective object or the respective data record, is copied in another column of the data table to several, namely all rows belonging to the object or the data record.

It has also proven to be particularly advantageous and clear if information about all objects stored in the data table and all dimensions that are assigned to the basic data of the objects are stored in the object table. Preferably, the object IDs assigned to the objects are stored in the ID column of the object table. Alternatively or in addition, a row is provided in the object table for each object and each dimension. The object table can also comprise column in which it is indicated whether it is a dimension, the dimension column. For example, the row or rows of the dimension column that belong to a dimension may contain a 1 and the row or rows that belong to an object may contain "NULL" to make this distinction clear.

An object can have a dimension and fields in an object can in turn have a dimension. The dimension of an object can also be referred to as the main dimension to distinguish it from the dimensions of fields of the object, which can also be referred to as field dimensions.

By way of example only, an "Item" object exists or is stored in the database and this item includes an item name in two or more different languages and prices for the item from different subsidiaries and is or are stored in the data table. In this case, the "Item" object has in particular two fields, each of which has one dimension, namely the "Language" dimension and the "Subsidiary" dimension. As basic data entries, it contains the item names in the various languages, e.g. "book", "Buch" and "livre" and the various prices, e.g. 15 euros for a subsidiary in Germany, 19 dollars for a subsidiary in the USA, 20 GBP for a subsidiary in the United Kingdom and 17 euros for a French subsidiary.

Another example of a dimension of an object is that an "Item" object has or is assigned the "Client" dimension in order to take account of a situation with more than one client. In this case, it would be appropriate to create it individually for each client, such as client A and client B. Then one or more fields of the object can have a dimension, e.g. a "Price" field can have the "Subsidiary" dimension for different subsidiaries in different countries, so that the price can or must be available in different currencies.

The data belonging to an object with dimension, in particular field dimension(s), expediently is/are stored in several rows of the data table. It is preferable for each object with (field) dimension(s) to have a first row, which in particular contains jointly valid data and which can also be referred to as the master row, as well as rows lying below, for example immediately below, for dimension data. The master row can be used to store basic data of the object that does not have a dimension, preferably all basic data that does not have a dimension. It is preferred that a common matching MasterRecordID is assigned to the master row and the rows lying below for the dimensional data. This can be the row ID that is listed in the first row belonging to the object in the data table, the master row. In other words, the row ID or MasterRecordID from the master row is then used for the additional rows with dimension data.

For the sake of completeness, it should be noted that the dimension or dimensions themselves can be or are objects. These can also be referred to as dimension objects. For reasons of simplicity, however, we will refer to objects on the one hand and dimensions on the other.

The data column or data columns of the data table preferably each have the name "Data_[number]", for example "Data_0", "Data_1", "Data_2" and "Data_3". These names are preferably used for data columns being provided as standard. It is of course also possible that user or customer-specific data columns are or will be provided. These can be designated with "C_Data_[number]", for example, where the "C" is an abbreviation for "custom".

The prefix "C-" can also be used in other tables to indicate that these are user- or customer-specific objects or data. For example, any user or customer-specific objects in the object table can begin with "C_".

A further particularly advantageous embodiment is also characterized by the fact that information about the structure of the objects is stored in a further table, field table. In this case it particularly applies that the field table contains the information in which data column or columns of the data table the basic data of the respective object is stored.

The field table can then comprise a column in which the names used in the data table of those data columns are specified in which basic data relating to the respective object are stored, field name column. In other words, the field names in the field table refer to real fields in the data table.

It is also possible for the field table to comprise a column in which it is specified basic data of which type are stored in the data column or the data columns of the respective object. This column can be referred to as the label column.

Alternatively or in addition, the field table can include a column in which it is specified whether the basic data belonging to the object in the data columns listed in the field name column each have a dimension or not and preferably which dimension is assigned to them. This column can be referred to as the dimension column.

This can be done in particular by using the higher-level dimension ID, i.e. the dimension master ID. In rows of basic data to which no dimension is assigned, "NULL" can for example be entered in the dimension column of the field table or the corresponding fields can remain empty. Rows of basic data to which a dimension is assigned preferably contain the dimension master ID of the corresponding dimension.

The field table can also comprise a column in which the object ID assigned to the respective object is specified. This column can be referred to as the object ID column.

Objects can comprise basic data in several data columns of the data table. If this is the case, a row is preferably provided in the field table for each data column in which basic data of the relevant object is stored. In the object ID column, the object ID is then preferably stored in each column of the object, i.e. the same ID is stored several times. The field table can also include further columns.

Further tables can also be provided. Preferably, however, each type of table exists exactly once, in particular exactly one data table and/or exactly one object table and/or exactly one field table. An exception can exist in particular if the method is used or implemented in a decentralized manner and, for example, copies of the respective table type are located on several servers or separate versions or copies of the respective table type exist for different clients.

For example, relations existing between different objects can be stored in another table, which can be referred to as a relation table.

If a relation table is used, a relation ID and/or a relation type and/or an object ID and/or an object field ID can be stored in it for the respective relation. A separate column can be provided in the relation table for the relation ID and/or the relation type and/or the object ID and/or the object field ID.

There can also expediently be at least one column in which the information is contained or stored which object has a relation to which object.

Alternatively or in addition, different instances can be stored in a further table, which can be referred to as an instance table. In an instance table, for example, an instance ID and/or an instance name and/or an instance license and/or a secret code can be stored for the respective instance. Here too, a column can be provided in the instance table for each of these aspects. Several instances can be provided in particular for the purpose of being able to filter for data from different users of the database, such as different business partners. In other words, the instances can represent main filters in order to output data for different users, such as business partners.

The data table can then include a column in which instance IDs are or will be stored, instance ID column.

It should be emphasized that, as far as the steps of the method according to the invention are concerned, the sequence is not important. Rather, the storage of data in the data table and, in particular, the object table and field table and any other tables present can take place in any order. For example, data can be stored first in the data table, then in the object table and then in the field table, or in any other order.

It also does not matter whether basic data are stored in the data table first and then the corresponding dimension IDs or vice versa.

In particular, an API, preferably a RESTful API, is called or used to retrieve data from the database. REST in a known manner stands for "REpresentational State Transfer" and API for "Application Programming Interface".

Another particularly preferred embodiment is characterized in that data is retrieved from the database, in particular from the data table, using a function that returns the largest of all values stored in a selected column. Such a function is provided, for example, by the MAX( ) function.

In particular, the targeted provision of empty entries or "NULL" entries in fields of the one data table comprising all data makes this possible. By using the MAX( ) function, considerable time savings can be achieved, particularly in comparison with queries of data that is distributed across several tables and for which the JOIN function is therefore required.

In a further advantageous embodiment, it is also provided that a dynamic script is used to retrieve data from the database, in particular the data table. A dynamic script generator can be used to retrieve data from the database, in particular the data table.

The method according to the invention can also be realized or implemented as "Software as a Service" (SaaS). In particular, no local installation of software is then required for the implementation or use of the method, but this can be done via web access, e.g. via a browser or by other means. For a SaaS solution, the Internet or a cloud can be used in a manner known per se.

In this case, one can also speak of a "database-as-a-service".

The invention also relates to a system for data processing comprising at least one processor and one or more memory devices, wherein the at least one processor is configured to perform the steps of the method according to the invention.

The system according to the invention can also be a distributed system with hardware at different locations and suitable networking, for example via the Internet.

In addition, the invention relates to a computer program product comprising instructions which, when the program is executed by at least one computer, cause the at least one computer to perform the steps of the method according to the invention.

Finally, the invention relates to a computer-readable storage medium comprising instructions which, when executed by at least one computer, cause the at least one computer to perform the steps of the method according to the invention.

BRIEF DESCRIPTION OF THE DRAWINGS

With regard to embodiments of the invention, reference is also made to the subclaims and to the following description of embodiments with reference to the accompanying drawing.

The drawing shows.

DETAILED DESCRIPTION OF THE PREFERRED EMBODIMENT(S)

Figure 1:
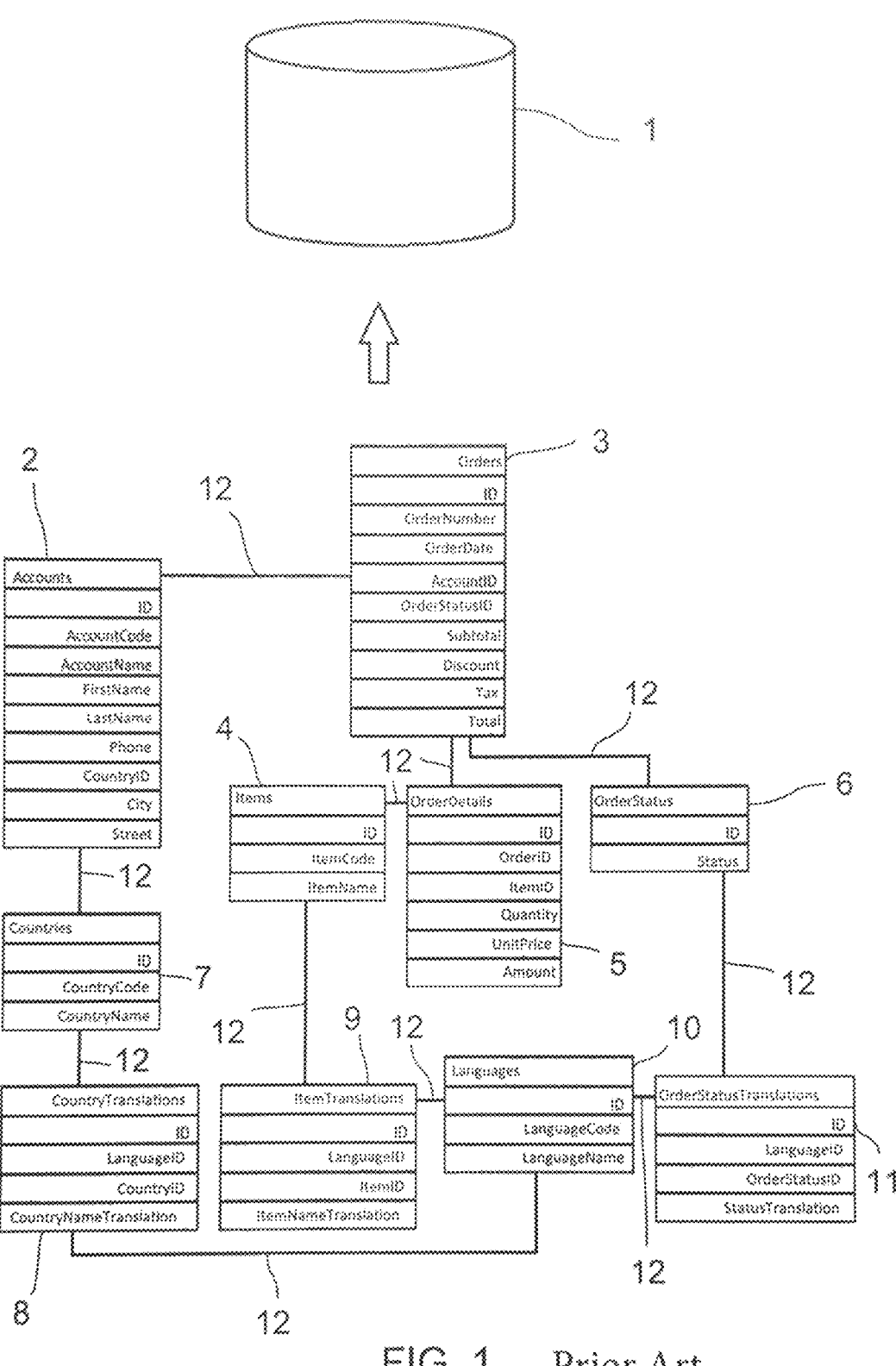
FIG. 1 a purely schematic block diagram of a conventional database in which the data is divided relationally into several tables.

The upper section of FIG. 1 shows a database 1 of a known type in purely schematic form. Below this, several tables 2-11 are shown, which—also purely schematically—illustrate how the data is stored. The arrow shown between database 1 and tables 2-11 is intended to make it clear that the data is stored or is being stored in database 1.

Objects, specifically business objects, are stored in the database, namely accounts, orders, items, order details, order statuses and countries. A table 2-7 had to be created for each of these objects. The tables are partially linked to each other via relations 12.

It may be necessary to save translations in database 1 for some data entries. This for example, because several subsidiaries of a company from different countries wish to use database 1 or an integrated database 1 is obtained for all these subsidiaries.

In the example shown in FIG. 1, three tables 4, 6 and 7 contain fields that require translation. These fields, which are highlighted in gray in FIG. 1, are ItemName, Status and CountryName in tables 4, 6 and 7 respectively. In order to support the translation, a separate table 8, 9, 11 must be created for each translation according to the previously known relational principle and the translation must be managed in the assigned 8, 9, 11. The languages are or will be stored in table 10.

For table 4 "Items", one obtains table 9 "ItemTranslations" linked to table 4 via a relation 12, for table 6 "OrderStatus" one obtains table 11 "OrderStatusTranslations" linked to table 6 via a relation 12 and for table 7 "Countries" one obtains table 8 "CountryTranslations" linked to table 7 via a relation 12

This solution is static. This means that a specific database 1 with associated tables 2-11 must be created for each project and then relations 12 must be created for the translations and specific SQL script queries must be created for each translation table 8, 9, 11, as the translation table names and the field names are not the same. In particular, it is necessary to work with JOIN commands, which are comparatively time-consuming, so that the queries are slow.

If, for example, a project comprises several subsidiaries and all of these are to be integrated in a database 1, database 1 becomes comparatively complex and requires more and time-consuming queries to obtain the desired results.

It is also necessary to know the names of the additional related tables. For example, if an item name is stored in several languages in an additional table with the name "ItemTranslation", this name must be known.

These disadvantages can be avoided by using the computer-implemented method according to the invention for storing data in a database, an exemplary embodiment of which is described in the following.

Figure 2:
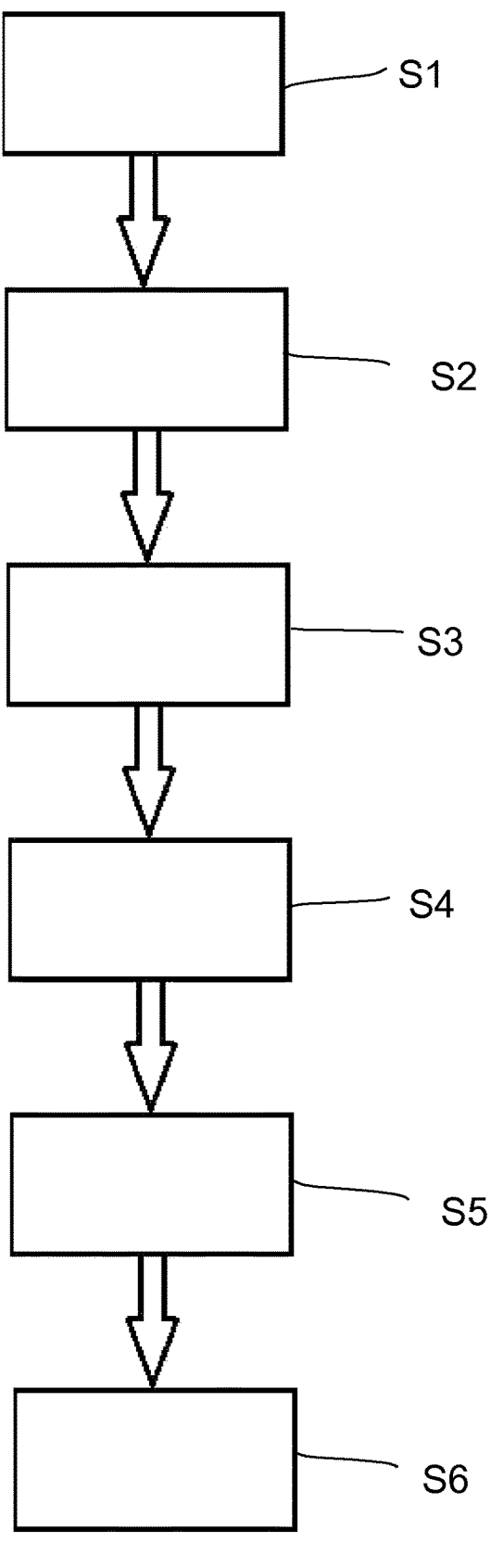
FIG. 2 a purely schematic block diagram showing the steps of an example embodiment of the method according to the invention.
Figure 3:
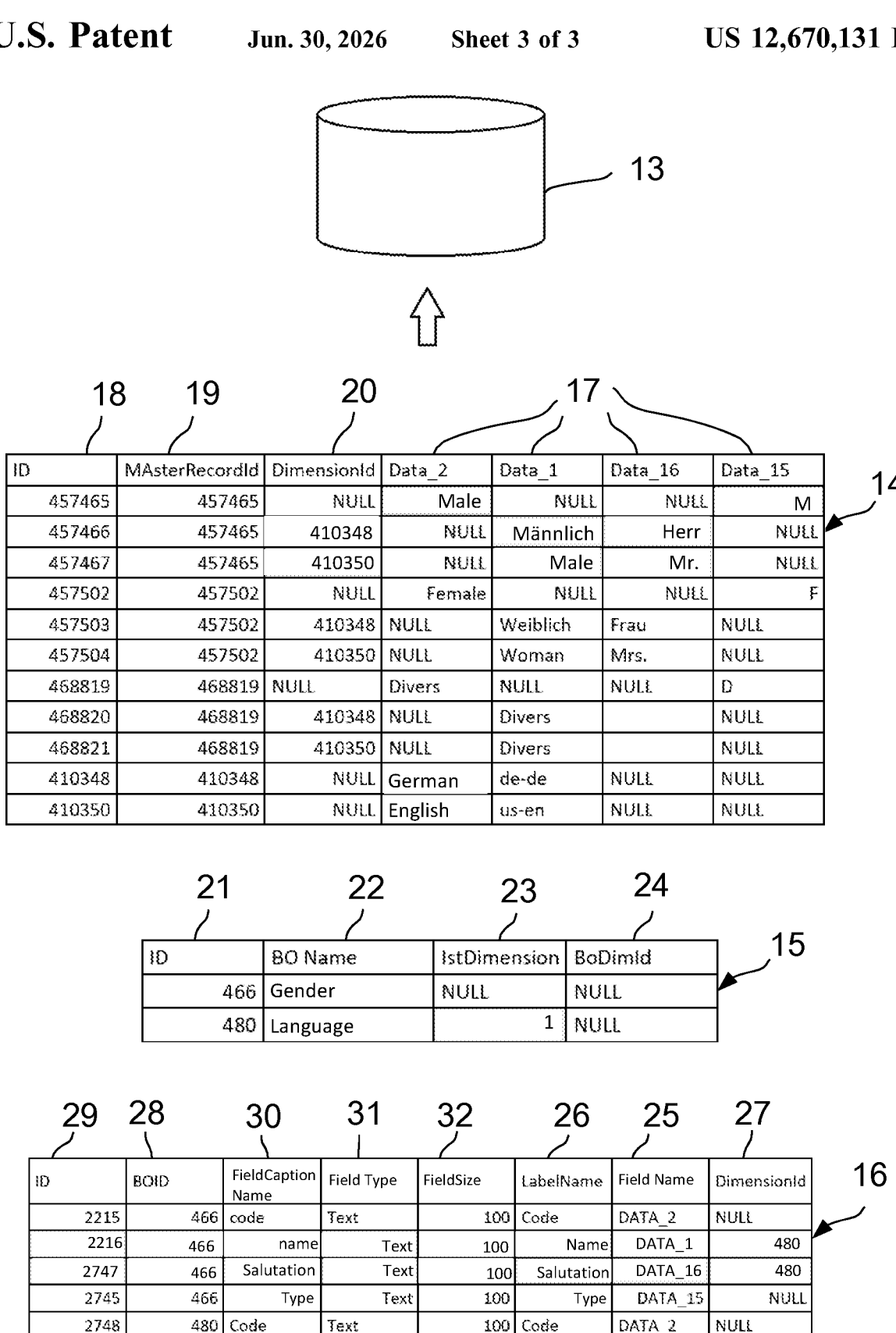
FIG. 3 a database in which basic data is stored in a data table according to an embodiment example of the method according to the invention.

FIG. 2 shows—in a purely schematic block diagram—the steps of the exemplary embodiment of the method. Top part of FIG. 3 shows, also schematically, a database 13 in which data is stored in accordance with the invention and from which data is retrieved in accordance with the invention. Examples of a data table 14, an object table 15 and a field table 16 are shown below. It should be noted that strongly simplified FIG. 3 shows only excerpts of the tables for illustration purposes and that these can and generally will comprise considerably more entries.

Within the framework of the database method, basic data is stored in the multi-column and multi-row data table 14 in data columns 17 provided for this purpose (step S1). In the example in FIG. 3, the data columns 17 are the four right-hand columns of the data table 14. It should be emphasized that data table 14 can in principle comprise both fewer or more than four data columns 17.

In addition to the data columns 17, the data table 14 also includes an ID column 18 (first, left-hand column), a master ID column 19 and a dimension column 20.

In the ID column 18, a particularly unique row ID, e.g. a globally unique ID, is specified. Specifically, this is a number that is consecutive with the rows of the data table 14. As mentioned, for reasons of simplified representation, only a section of the entire data table 14 is shown in FIG. 3, which is why there are "leaps" with regard to this ID, e.g. from 457467 to 457502 etc.

At least one dimension is assigned to the basic data from at least some fields, the at least one dimension indicating that these basic data are related to one another (step S2). In the present case, the basic data to which a dimension is or will be assigned are given by translations of the same expression into different languages. The dimension "Language" is therefore assigned to the affected basic data.

In the exemplary embodiment shown, the basic data stored in the data table 14 in the data columns 17 are genders or gender details for persons. In other words, an object "gender" is stored in the data table. Specifically, the object "gender" comprises the three options "Male", "Female" and "Diverse". Each gender option has a code that is given by these designations, a type specification, specifically "M", "F" and "D" in the corresponding order, a name and also a title.

One data record is stored in data table 14 for each of the three gender options of the object "Gender". For "Male" in the first to third of the rows shown in data table 14, for "Female" in the fourth to sixth row and for "Diverse" in the seventh to ninth row.

In the example shown, one dimension is assigned to the name and title. This because these two details require a translation, for example for subsidiaries with different languages.

The assignment of the respective dimension to the respective affected basic data is carried out by storing dimension IDs belonging to the or the respective dimension in those rows in which the fields of the or the respective affected basic data are located, in another column which is not a data column and which is provided for the assignment of the or the respective dimension, dimension column 20, wherein dimension IDs belonging to the same dimension differ from one another.

In the example shown in FIG. 3, the dimension IDs are stored in the third column 20 from the left. Here, basic data is stored in German and English, so that two different dimension IDs are used for these two different languages. One could also say that there are two dimension branches, namely German and English. The fact that there are two languages and therefore two dimension branches is purely exemplary. Of course, the dimension "Language" could include other languages in addition to German and English, such as three, four, five or even more languages.

Here, dimension ID 410348 is used for the German version and dimension ID 410350 for the English language, wherein this is to be understood as purely exemplary and other numbers or other alphanumeric identifiers or identifiers of other types may also be used. The entry of these dimension IDs in the corresponding rows indicates that a dimension is assigned to this basic data, in this case the dimension "Language". The dimension IDs can be found in the second and third row of each data record.

Data table 14 contains the following data on the "Language" shown in the bottom two rows in FIG. 3:

| ID | MasterRe-cordId | Dimen-sionId | Data_2 | Data_1 | Data_16 | Data_15 |
|---|---|---|---|---|---|---|
| 410348 | 410348 | NULL | German | de-de | NULL | NULL |
| 410350 | 410350 | NULL | English | us-en | NULL | NULL |

For the gender "Male", the corresponding fields in FIG. 3 are highlighted in light gray, for example, both the data column fields with the translations "Männlich" and "Male" as well as "Herr and "Mr." and the corresponding fields of the dimension column 20 in the same rows.

As you can see, for data column fields with basic data to which a dimension is assigned, the fields in the same row in other data columns that are intended for basic data to which this dimension is not assigned remain empty or contain empty entries, in this case specifically the entry "NULL". Here, for example, the fields in the same rows of the left and right data columns 17, which are named "Data_2" and "Data_15", have an empty entry "NULL", i.e. no data content. The same applies to the gender "Female" and the gender "Diverse".

It also applies that for data column fields with basic data to which no dimension is assigned in the dimension column 20, no dimension IDs are stored in the fields in the same row. These in particular remain empty or are provided with an empty entry. For example, the second, fifth and eighth rows from the top of the dimension column 20 each contain "NULL", as neither the code nor the gender type is assigned the "Language" dimension. The "NULL" entry in the dimension column 20 is found for the "Gender" object in the top row of each of the three associated data records for the three gender options, i.e. in the first, fourth and seventh rows shown of the data table 14. These rows can also be referred to as the master rows of the respective data record. The code and type are listed in these rows, i.e. the basic data without dimension.

In addition, a matching master ID is assigned to several basic data (step S3). The multiple rows then represent one record or belong to one record, whereby a dimension exists. The master ID is stored in those rows of the data table in which the fields of the respective basic data are located, but in a different column, which is not a data column, the master ID column 19.

Specifically, a common, matching master ID (Master-RecordId) is assigned to each of the three rows of a data record, which is stored in the MasterRecordId column 19 in the corresponding rows.

In this case, the common master ID 457465 is assigned to the basic data for the gender option "Male". In analog manner, the common master ID 457502 is assigned to the basic data for the gender option "Female" and the master ID 468819 is assigned to the gender option "Divers". In all three rows containing basic data for "Male", the ID 457465 is therefore entered in the master ID column 19 and 457502 in the three rows with basic data for "Female" and 468819 in the three rows for "Divers". This basic data therefore refers to one master ID or one master record. As can be seen, the master ID 457465 from "Male" matches the ID from the first row of ID column 18 (under the title row). This ID from column 18 is the ID of the public record and the match means that the entries from the three rows of the data set, which all have 457465 as the master ID in column 19, practically form one entry or one "record". It can also be said that the master ID of the respective master row is transferred to the rows below for the dimension data.

The master ID 457502 of "Female" matches the ID in the fifth row of ID column 18 in the same way and the master ID 468819 of "Divers" matches the ID in the eighth row of column 18. These ID numbers are also all purely exemplary and could be different in principle.

The last two rows of the section of the data table 14 shown in FIG. 3, which belong to the master IDs 410348 and 410350, comprise, as already mentioned above, a mapping of the individual languages of the dimension "Language", i.e. German and English, and these master IDs. The master IDs represent the dimension IDs assigned to the two languages. As one can see, these, i.e. 410348 and 410350, are used in column 20 with the dimension ID of the three data records of the "Gender" object. This indicates which row regards or contains data in German and which contains data in English.

Information about the dimension is also stored in a further table, the object table 15 (step S4). It should be noted that, of course, several dimensions may be present, in which case information about all dimensions is preferably stored in the object table 15.

In the example shown, the object table 15 includes an ID column 21, in which an ID belonging to the respective dimension is listed. As can be seen, the object "Gender" is assigned the ID 466 and the dimension "Language" is assigned the ID 480. This ID—in contrast to the dimension IDs 410348 and 410350 for the two languages DE and EN—can also be understood and described as the dimension master ID.

The object table 15 also comprises a name column 22 in which a name assigned to the respective dimension is listed.

As explained above, objects are stored in the database, with the basic data from one or more fields from one or more data columns of the data table belonging to each object. An object ID is assigned to each object (step S5).

In the present case, information about all objects stored in the data table 14, including all objects representing dimensions that are assigned to the basic data of the objects, is stored in the object table 15. The object IDs assigned to the objects are stored in the ID column 21 of the object table 15.

Furthermore, a row is provided in the object table 15 for each object and each dimension and the object table 15 comprises a column in which it is indicated whether it is a dimension, dimension column 23.

The information as to whether it is a dimension or not is stored as follows. In the dimension column 23, a 1 is entered for dimensions and "NULL" for objects. In the top row with the object "Gender", "NULL" is therefore entered in the dimension column 23 and in the bottom row for the dimension "Language" a 1. This field is highlighted in light gray to clarify the connection with the dimension from data table 14.

In the example shown, the object table 15 further comprises an object dimension ID column 24, which is abbreviated as "BoDimId" in the table. Using this field or the fields in this column 24, it is possible to assign a dimension directly to an object, such as a business object. If this is the case, it is not necessary to configure individual fields with a dimension, but all fields of the object have a dimension which is inherited from the object.

Information about the structure of the objects is also stored in a further table, the field table 16 (step S6). In the example shown, the field table 16 contains the information in which data column 17 or which data columns 17 of the data table 14 the basic data of the respective object are stored.

Field table 16 also includes a column in which the names of the data columns 17 used in the data table 14 are specified, in which basic data for the respective object is stored. This column is referred to as the field name column 25.

Field table 16 also comprises a column indicating the type of basic data stored in the data column(s) of the respective object. This column, which contains field names, can also be referred to as the label column 26 or label name column. As one can see, the information code, name, title and type can be found here.

Field table 16 also has a dimension column 27, in which it is indicated whether the basic data belonging to the object in the data columns listed in the field name column 25 each have a dimension or not. In the present case, the dimension column 27 also indicates which dimension is assigned. As can be seen, it is stated here that a dimension is assigned to the name and title of the object "Gender", but not to the code and type. At the bottom of column 27, it is indicated for the dimension object "Language" that no dimension is assigned to it. It is a dimension and there are "NULL" entries in these two columns of row 27.

Furthermore, field table 16 includes a column in which the object ID assigned to the respective object is specified, object ID column 28. Accordingly, the unique identity of the respective object is specified here, whereby the object "Gender" has the object ID 466 and the dimension object "Language" has the object ID 480, which is the higher-level dimension master ID.

Further columns of the field table 16 are an ID column 29, a FieldCaptionName column 30, a FieldType column 31 and a FieldSize column 32.

An ID is specified in the ID column 29, as in the ID column 18 of the data table 14. The IDs are also consecutive in the field table 16 and can be understood and designated as row IDs. Since only a section of the field table 16 is shown in FIG. 3, specifically only those areas that relate to the two objects "Gender" and "Language", the IDs are not all consecutive here, but there is a "leap" from 2216 to 2747.

In the section shown, the object ID column 28 therefore only contains the ID 466 assigned to the object "Gender" and the ID 480 assigned to the object "Language" (see also column 21 of object table 15). Field column 25 shows that the data columns 17 "DATA_2", "DATA_1", "DATA_16" and "DATA_15" contain basic data of the object "Gender" with the object ID 466. In label column 26 next to field column 25, the type of basic data stored in the respective data column according to column 25 of the respective object is specified in corresponding rows. As can be seen, the code of the respective gender is stored in data column 17 "DATA_2", the name of the respective gender in data column 17 "DATA_1", the salutation for the respective gender in data column 17 "DATA_16" and the gender type, specifically the abbreviations "M", "F" and "D", in data column 17 "DATA_15". According to dimension column 27, a dimension is assigned to the name and the form of address, namely the dimension with the dimension master ID 480, i.e. the dimension "Language" according to the object table.

FieldCaptionName column 30 contains field names for the display. FieldTypes column 31 contains the SQL data type of the field. The field size column 32 contains the size of the field for the data type specified in the field type column 31.

Other tables may exist and data be saved in such.

For example, existing relations between different objects can be stored in a relation table. A relation ID and/or a relation type and/or an object ID and/or an object field ID can be stored in such a table for the respective relation, for example.

It is also possible for different instances to be stored in an instance table. For example, an instance ID and/or an instance name and/or an instance license and/or a secret code can be stored for the respective instance. Multiple instances make it possible in particular to take account of a situation with multiple customers or clients. In this case, an instance is preferably assigned to each customer or client and it is only possible for each customer to retrieve data from their instance, so that data protection is guaranteed.

If one retrieves the result for the gender "Male", one can get one or two entries depending on which query is used for the dimension, in the case of two languages:

| MasterRecordId | DimensionId | Data_2 | Data_1 | Data_16 | Data_15 |
|---|---|---|---|---|---|
| 457465 | 410348 | Male | Männlich | Herr | M |
| 457465 | 410350 | Male | Male | Mr. | M |

If the gender (as a whole) and the language German is queried, the result looks like this in json format as the output of a RESTful API:

```
{
  "items": [
    {
      "data": {
        "code": "Male",
        "CreatedBy": "admin@ms360base.de",
        "CreatedDate": "2021-02-12T12:24:57.503+01:00",
        "Dimension": {
          "Language": {
            "Bold: 480,
            "IsDefault": true,
            "LanguageCode": "de-DE",
            "LanguageName": "German",
            "MasterRecordID": 410348
          }
        },
        "Dimensions": "410348",
        "MasterRecordID": 457465,
```

"MS_Bold": 466,
          "MS_ProductNumber": 10,
          "MS_RecordLevel": 1,
          "name": "Männlich",
          "Salutation": "Herr"
          "Type ": "M",
          "Updatedby": "admin@ms360base.de",
          "UpdatedDate": "2021-02-12T12:28:27.303+01:00"
        }
      },
      {
        "data": {
          "code": "",
          "CreatedBy": "admin@ms360base.de",
          "CreatedDate": "2021-02-12T12:30:05.537+01:00",
          "Dimension": {
            "Language": {
              "Bold: 480,
              "IsDefault": true,
              "LanguageCode": "de-DE",
              "LanguageName": "German",
              "MasterRecordID": 410348
            }
          },
          "Dimensions": "410348",
          "MasterRecordID": 457502,
          "MS_Bold": 466,
          "MS_ProductNumber": 10,
          "MS_RecordLevel": 1,
          "name": "Weiblich",
          "Salutation": "Frau",
          "Type ": "F",
          "Updatedby": null,
          "UpdatedDate": null
        }
      },
      {
        "data": {
          "code": "Divers",
          "CreatedBy": "admin@ms360base.de",
          "CreatedDate": "2021-02-25T11:16:04.49+01:00",
          "Dimension": {
            "Language": {
              "Bold: 480,
              "IsDefault": true,
              "LanguageCode": "de-DE",
              "LanguageName": "German",
              "MasterRecordID": 410348
            }
          },
          "Dimensions": "410348",
          "MasterRecordID": 468819,
          "MS_Bold": 466,
          "MS_ProductNumber": 10,
          "MS_RecordLevel": 1,
          "name": "Divers",
          "Salutation": "",
          "Type ": "D",
          "Updatedby": null,
          "UpdatedDate": null
        }
      }
    ]
  }

If the English language is requested, the result is as follows:

{
  "items": [
    {
      "data": {
        "code": "Male",
        "CreatedBy": "admin@ms360base.de",
        "CreatedDate": "2021-02-12T12:24:57.52+01:00",
        "Dimension": {
          "Language": {

"Bold: 480,
              "IsDefault": false,
              "LanguageCode": "en-US",
              "LanguageName": null,
              "MasterRecordID": 410350
            }
          },
          "Dimensions": "410350",
          "MasterRecordID": 457465,
          "MS_Bold": 466,
          "MS_ProductNumber": 10,
          "MS_RecordLevel": 1,
          "name": "Male",
          "Salutation": "Mr.",
          "Type ": "M",
          "Updatedby": "admin@ms360base.de",
          "UpdatedDate": "2021-02-12T12:28:27.32+01:00"
        }
      },
      {
        "data": {
          "code": "",
          "CreatedBy": "admin@ms360base.de",
          "CreatedDate": "2021-02-12T12:30:05.537+01:00",
          "Dimension": {
            "Language": {
              "Bold: 480,
              "IsDefault": false,
              "LanguageCode": "en-US",
              "LanguageName": null,
              "MasterRecordID": 410350
            }
          },
          "Dimensions": "410350",
          "MasterRecordID": 457502,
          "MS_Bold": 466,
          "MS_ProductNumber": 10,
          "MS_RecordLevel": 1,
          "name": "Woman",
          "Salutation": "Mrs.",
          "Type ": "F",
          "Updatedby": null,
          "UpdatedDate": null
        }
      },
      {
        "data": {
          "code": "Divers",
          "CreatedBy": "admin@ms360base.de",
          "CreatedDate": "2021-02-25T11:16:04.49+01:00",
          "Dimension": {
            "Language": {
              "Bold: 480,
              "IsDefault": false,
              "LanguageCode": "en-US",
              "LanguageName": null,
              "MasterRecordID": 410350
            }
          },
          "Dimensions": "410350",
          "MasterRecordID": 468819,
          "MS_Bold": 466,
          "MS_ProductNumber": 10,
          "MS_RecordLevel": 1,
          "name": "Divers",
          "Salutation": "",
          "Type": "D",
          "Updatedby": null,
          "UpdatedDate": null
        }
      }
    ]
}

It should be emphasized that the sequence of the steps described above is not important. For example, it is possible, but not necessary, to first store basic data in the data table 14 and then make entries in the object table 15 and/or field table 16. The reverse sequence is equally possible. In other words, the information about the dimension(s)/object(s) and their structure can also be stored first and then the data can be stored in the data table 14. The content of a database will constantly change during operation anyway, for example because new customers, products etc. are added or existing ItemCode, the length and width as well as two further entries for the ItemName in two different languages.

If one assumes an object ID (Bold) of 101 and, for example, the dimension ID 200 for German and the dimension ID 201 for English, the entry in the data table 14 for this example is:

| ID | MasterRecordId | Bold | DimensionId | Data_1 | Data_2 | Data_3 | Data_4 |
|----|----------------|------|-------------|--------|--------|--------|--------|
| 5000 | 5000 | 101 | Null | 200101 | Null | 200 | 100 |
| 5001 | 5000 | 101 | 200 | Null | Tisch | Null | Null |
| 5002 | 5000 | 101 | 201 | Null | Table | Null | Null | ones are removed. Here too, it does not matter in which order the steps of the method according to the invention are carried out.

It also does not matter whether basic data are stored in data table 14 first and then corresponding dimension IDs or vice versa.

Preferably, the same structure is used for all objects when the dimension is set for fields for which dimension values must be saved, such as the name of the gender, as described above.

The storage of related data in a data table 14 and the associated use of dimension(s) offers considerable advantages. In particular, if the same data table 14 is used, it is not necessary to generate several script queries in order to obtain results from the database 13 and the JOIN function for joining several tables (see FIG. 1) is not (absolutely) necessary. A database 13 with a dynamic infrastructure is obtained. A dynamic script generator can be used and queries of data from the one data table 14 can be performed using a MAX( ) function. The query can therefore be accelerated many times over compared to previously known relational solutions. As a result, (computing) time, effort and also energy can be saved. The method according to the invention is therefore also particularly sustainable.

The following is a purely exemplary description of how the data query can be carried out.

As described above, each object has fields that specify the object structure. The data is stored in the data table 14, which specifically contains empty entries or "NULL" entries. The MAX( ) function can be used to obtain the data for the respective dimension. A public record for storing the object's public fields and additional dimension entries for each dimension that the object has or that the object's fields have are stored in data table 14.

As described, the dimension ID in the public record is NULL and the MasterRecordID of the public record is used as the MasterRecordID for all entries (see data table 14, in particular columns 18 and 19).

For reasons of simplification, the following object "Item" is now assumed:

| FieldCaptionName | FieldName | FieldType | DimensionId |
|------------------|-----------|-----------|-------------|
| ItemCode | Data_1 | String | |
| ItemName | Data_2 | String | 100 |
| Length | Data_3 | Number | |
| Width | Data_4 | Number | |

Here, the higher-level dimension ID 100 stands for the object "Language" representing a dimension. In this example, if data is saved for the "Item" and two languages exist, three entries are inserted, a public record with the (regarding the structure compare with Table 14 in FIG. 3)

Data can be queried using the MAX( ) function, which is a function that returns the largest value of a selected column.

To obtain the result for the German language, the following SQL script can be used for the example:

Select max(MasterRecordId) as MasterRecordId,max(Data_1) as ItemCode,max(Data_2) as ItemName,max(Data_3) as Length, max(Data_4) as Width from Ms4_data where Bold=101 and (DimensionId=200 or DimensionId is null) group by MasterRecordId The result is:

| MasterRecordId | Bold | ItemCode | ItemName | Length | Width |
|----------------|------|----------|----------|--------|-------|
| 5000 | 101 | 200101 | Tisch | 200 | 100 |

If one wants to retrieve data for both languages, such a script is used for each of the two languages and connected via the UNION function:

Select max(MasterRecordId) as MasterRecordId,max(Data_1) as ItemCode,max(Data_2) as ItemName,max(Data_3) as Length, max(Data_4) as Width from Ms4_data where Bold=101 and (DimensionId=200 or DimensionId is null) group by MasterRecordId
UNION ALL
Select max(MasterRecordId) as MasterRecordId,max(Data_1) as ItemCode,max(Data_2) as ItemName,max(Data_3) as Length, max(Data_4) as Width from Ms4_data where Bold=101 and (DimensionId=201 or DimensionId is null) group by MasterRecordId The result is:

| MasterRecordId | Bold | ItemCode | ItemName | Length | Width |
|----------------|------|----------|----------|--------|-------|
| 5000 | 101 | 200101 | Tisch | 200 | 100 |
| 5000 | 101 | 200101 | Table | 200 | 100 |

Of course, it is also possible for an entry in data table 14 to have two fields, each having one dimension. For example, the above example of the "Item" may require a price for different countries with different currencies in addition to the name in different languages.

If, for example, the higher-level dimension master ID (Bold) for the country is 102 and the dimension ID for Germany is 600 and the dimension ID for the USA is 601, the result is:

| FieldCaptionName | FieldName | FieldType | DimensionId |
|------------------|-----------|-----------|-------------|
| ItemCode | Data_1 | String | |
| ItemName | Data_2 | String | 100 |

-continued

| FieldCaptionName | FieldName | FieldType | DimensionId |
|---|---|---|---|
| Length | Data_3 | Number | |
| Width | Data_4 | Number | |
| Price | Data_5 | Money | 102 |

If data is saved for the two different languages and the two countries with the different currencies, the result in data table 14 is e.g:

| ID | MasterRecordId | Bold | DimensionId | Data_1 | Data_2 | Data_3 | Data_4 | Data_5 |
|---|---|---|---|---|---|---|---|---|
| 5000 | 5000 | 101 | Null | 200101 | Null | 200 | 100 | Null |
| 5001 | 5000 | 101 | 200 | Null | Tisch | Null | Null | Null |
| 5002 | 5000 | 101 | 201 | Null | Table | Null | Null | Null |
| 5003 | 5000 | 101 | 600 | Null | Null | Null | Null | 30 € |
| 5004 | 5000 | 101 | 601 | Null | Null | Null | Null | 35 $ |

(regarding the structure compare with Table 14 in FIG. 3)

If a query is required for all dimensions, the following applies. As there are two entry dimensions for the language and two entry dimensions for the countries, there are four entries:

Language German, price for Germany (in €)

a. Language German, price for the USA (in $)

Language English, price for Germany (in €)

b. Language English, price for the USA (in $)

Before the script for all dimensions is specified, the script for just one dimension is explained, exemplarily for:

the German language with the RecordID=200 and the country Germany with the RecordID=600.

The script query then reads:

Select max(MasterRecordId) as MasterRecordId,max (Data_1) as ItemCode,max(Data_2) as ItemName,max (Data_3) as Length, max(Data_4) as Width, max (Data_5) as Price from Ms4_data where Bold=101 and (dimensioned in (200,600) or dimensioned is null) group by MasterRecordId And the query result:

| MasterRec-ordId | Bold | ItemCode | ItemName | Length | Width | Price |
|---|---|---|---|---|---|---|
| 5000 | 101 | 200101 | Tisch | 200 | 100 | 30 € |

If the data is required for the language German and all countries, the following applies:

the German language with the RecordID=200, the country Germany with the RecordID=600, the country USA with the RecordID=601

To obtain the data here, the data for each dimension set is queried and the results are combined with UNION:

The dimension set is: (200,600), (200,601)

The script query is:

Select max(MasterRecordId) as MasterRecordId,max (Data_1) as ItemCode,max(Data_2) as ItemName,max (Data_3) as Length, max(Data_4) as Width, max (Data_5) as Price from Ms4_data where Bold=101 and (dimensioned in (200,600) or dimensioned is null) group by MasterRecordId

UNION ALL

Select max(MasterRecordId) as MasterRecordId,max (Data_1) as ItemCode,max(Data_2) as ItemName,max (Data_3) as Length, max(Data_4) as Width, max (Data_5) as Price from Ms4_data where Bold=101 and (dimensioned in (200,601) or dimensioned is null) group by MasterRecordId The result is:

| MasterRec-ordId | Bold | ItemCode | ItemName | Length | Width | Price |
|---|---|---|---|---|---|---|
| 5000 | 101 | 200101 | Table | 200 | 100 | 30 € |

-continued

| MasterRec-ordId | Bold | ItemCode | ItemName | Length | Width | Price |
|---|---|---|---|---|---|---|
| 5000 | 101 | 200101 | Table | 200 | 100 | 35 $ |

A dynamic script can be generated, which is exemplarily explained below using an example.

It is assumed that a data table with the name "MS4_data" exists in which all data entries are contained. Such a data table is given by the table 14 shown in excerpts in FIG. 3.

There is a field Bold (see Table 16, column 28) that refers to an object ID, such as a business object ID, so that it is known to which business object the entries belong.

As above, a business object "Item" with the object ID (Bold) 101 and with another business object "account" with the Bold 102 are assumed. If all entries for the object "Item" are required, a script as follows is needed:

Select * from ms4_data where Bold=101

For the business object "Account":

Select * from ms4_data where Bold=102

It can be designed dynamically, in particular to create a procedure in SQL and be able to pass the business object name as a parameter and receive all entries for this business object.

The procedure "GetData" can be created.

Create Procedure GetData

@BoName nvarchar(200)

Ace

Declare Bold int;

Select @Bold=ID from MS4_BObject where BObjectName=@BoName

If @Bold is null

THROW 60000, 'Business object name is not valid', 1;

Select * from MS4_Data where Bold=@Bold

Then one can let this run via

Exec GetData 'Item' or

Exec GetData 'Account'.

Then there is a procedure that can be used to obtain data with the business object name.

In data table 14 "MS4_data" there are fields whose names begin with "data_" (data_1, data_2, data_3, . . . cf. columns 17 of table 14 in FIG. 3) and a mapping is stored between the field name in the business object and the real field column in MS4_data.

| FieldCaptionName | FieldName | FieldType | DimensionId |
|---|---|---|---|
| ItemCode | Data_1 | String | |
| ItemName | Data_2 | String | 100 |
| Length | Data_3 | Number | |
| Width | Data_4 | Number | |

In this example, the ItemCode is mapped to Data_1, the ItemName to Data_2 and so on.

One can adapt the dynamic procedure to get the business object FieldCaptionName for each business object. The following script can be created for this purpose:

Select data_1 as itemcode, data_2 as itemname from ms4_data where boid=101

As the fieldCaptionName is different for each object and mapped to different real fields in data table 14 "MS4_data", a dynamic solution is appropriate.

All fields of a business object can be obtained, for example, via

Select feldcaptionname from ms4_field where boid=101
The result is:

```
fieldcaptionname
ItemCode
ItemName
Length
Width
```

The field name is required to select and generate a script as follows: max(Data_1) as Itemcode. To do this, the script can be adapted to:

Select 'Max('+fieldname+') as '+fieldcaptionname from ms4_field where boid=101
The result is:

```
Max(Data_1) as ItemCode
Max(Data_2) as ItemName
Max(Data_3) as Length
Max(Data_4) as Width
```

In the next step one can join these rows and separate them with a comma (,), then the following code can be used:

SELECT STUFF((SELECT ','+'Max('+fieldname+') as '+fieldcaptionname from MS4_Field where BOID=101 FOR XML PATH("), TYPE).value('.', 'NVARCHAR (MAX)'),1,0,") )
The result is:

Max(Data_1) as ItemCode,Max(Data_2) as ItemName, Max(Data_3) as Length,Max(Data_4) as Width Now you can change the dynamic procedure GetData:

Create Procedure GetData
@BoName nvarchar(200), @Dimension nvarchar(1000) Ace
Declare Bold int;
Select @Bold=ID from MS4_BObject where BObjectName=@BoName
If @Bold is null
THROW 60000, 'Business object name is not valid', 1;
Declare @fields nvarchar(max), @script nvarchar(max)
Set @fields=STUFF((SELECT ','+'Max('+fieldname+') as '+fieldcaptionname from MS4_Field where BOID=101 FOR XML PATH("), TYPE).value('.', 'NVARCHAR(MAX)'),1,0,") Set @script='SELECT Max(MasterRecordID) as MasterRecordId'+@fields+' from MS_Data where Boid=@Bold and (Dimension in (select value from string_split(@dimension, ',')) or DimensionId is null) group by MasterRecordId'EX-ECUTE sp_executesql @script, N'@Bold int, @Dimension nvarchar(1000)', @Bold=@Bold, @dimension=@dimension
And let it run via
Exec GetData 'Item', '200,201'
Or
Exec GetData 'Account', '200,201'

Using the MAX( ) function saves a considerable amount of time during the query. This is especially true in comparison with queries that require the JOIN function, as the data is not stored in one table but in different tables, as shown in FIG. 1.

The database 13 shown schematically in FIG. 3 can comprise suitable hardware, in particular at least one storage device, or be implemented on such a device. Such can be part of an embodiment of a system for data processing according to the invention. Such a system then also comprises at least one processor configured to carry out the steps of the method according to the invention. A system according to the invention can of course also be a distributed system with hardware at different locations and suitable networking, for example via the Internet.

The method according to the invention can also be realized as "Software-as-a-Service".

The invention claimed is:

1. A computer-implemented database method comprising:
storing basic data to be stored (S1) in a multi-column and multi-row data table (14) of a database (13) in data columns (17) provided for this purpose, and
assigning at least one dimension to the basic data of at least some fields, the at least one dimension indicating that the basic data are related to one another (S2),
wherein the assignment of the at least one dimension the basic data takes place by storing dimension IDs belonging to the at least one dimension in rows in which the at least some fields of the basic data are located, in another column which is not a data column of the data columns and which is provided for the assignment of the at least one dimension, a dimension column (20), wherein dimension IDs of the dimension IDs belonging to a same dimension of the at least one dimension differ from one another,
wherein objects are stored in the database (13),
wherein the basic data from one or more of the fields from one or more of the data columns (17) of the data table (14) belong to each of the objects,
wherein an object ID is assigned to each of the objects,
wherein data for at least one object is stored in several rows in the data table,
wherein a matching master ID is assigned to several rows of the at least one object,
wherein the matching master ID is stored in a master ID column of the data table in the several rows to which the matching master ID is assigned,
wherein for data column fields with the basic data to which a dimension is assigned, it applies that in other data columns (17) which are provided for the basic data to which this dimension is not assigned, the fields in a same row remain empty or comprise empty entries, and/or wherein for data column fields with the basic data to which no dimension is assigned, it applies that no dimension IDs are stored in the dimension column (20) in the fields in the same row,
wherein data is retrieved from the data table (14), and wherein the retrieval of data from the data table (14) is carried out using a function which returns a largest of values stored in a selected column.

2. The database method according to claim 1, wherein all the basic data to be stored are stored in the data table (14).

3. The database method according to claim 1, wherein the matching master ID is assigned to a plurality of basic data, wherein the matching master ID is stored in those rows of the data table (14) in which the fields of the basic data are located, in another column which is not a data column of the data columns, master ID column (19).

4. The database method according to claim 1, wherein information about the at least one dimension is stored in an object table (15), wherein the object table (15) comprises an ID column (21) in which an ID associated with the at least one dimension is listed, and a name column (22) in which a name associated with the at least one dimension is listed.

5. The database method according to claim 4, wherein information about all objects stored in the data table (14) and all dimensions associated with basic data of the objects is stored in the object table (15), wherein the object IDs assigned to the objects are stored in the ID column (21) of the object table (15), and/or a row is provided in the object table (15) for each object and each dimension, and/or the object table (15) comprises a column in which it is indicated whether it is a dimension, dimension column (23).

6. The database method according to claim 1, wherein information about the structure of the objects is stored in a further table, field table (16), wherein the field table (16) comprises the information in which data column (17) or which data columns (17) of the data table (14) the basic data of the respective object are stored.

7. The database method according to claim 6, wherein the field table (16) comprises a column in which the names used in the data table (14) of those data columns (17) are specified in which basic data relating to the respective object are stored, field name column (25), and/or in that the field table (16) comprises a column in which it is specified basic data of which type are stored in the data column or the data columns of the respective object, label column (26), and/or in that the field table (16) comprises a column in which it is specified whether the basic data belonging to the object in the data columns (17) listed in the field name column (25) each have a dimension or not, dimension column (27), and/or in that the field table (16) comprises a column in which the object ID assigned to the respective object is specified, object ID column (28).

8. The database method according to claim 1, wherein relations existing between different objects are stored in a further table, relation table, wherein a relation ID and/or a relation type and/or an object ID and/or an object field ID are stored in the relation table for the respective relation.

9. The database method according to claim 1, wherein different instances are stored in a further table, instance table, and wherein an instance ID and/or an instance name and/or an instance license and/or a secret code are stored in the instance table for the respective instance.

10. The database method according to claim 1, wherein a dynamic script and/or a dynamic script generator is used for retrieving data from the data table (14).

11. A system for data processing comprising at least one processor and at least one memory devices, wherein the at least one processor is configured to perform the steps of the method according to claim 1.

12. A computer program product comprising instructions which, when the computer program product is executed by at least one computer, cause the at least one computer to perform the steps of the method according to claim 1.

13. A non-transitory computer-readable storage medium comprising instructions which, when executed by at least one computer, cause the at least one computer to perform the steps of the method according to claim 1.

14. The database method according to claim 2, wherein for data column fields with the basic data to which a dimension is assigned, it applies that in other data columns (17) which are provided for the basic data to which this dimension is not assigned, the fields in a same row remain empty or comprise empty entries, and/or that for data column fields with the basic data to which no dimension is assigned, it applies that no dimension IDs are stored in the dimension column (20) in the fields in the same row, but these in particular remain empty or comprise empty entries.

15. The database method according to claim 2, wherein the matching master ID is assigned to a plurality of basic data, wherein the matching master ID is stored in the rows of the data table (14) in which the fields of the basic data are located, in another column which is not a data column of the data columns, master ID column (19).

16. The database method according to claim 1, wherein the matching master ID is assigned to a plurality of basic data, wherein the matching master ID is stored in those the rows of the data table (14) in which the fields of the basic data are located, in another column which is not a data column of the data columns, master ID column (19).

\* \* \* \* \*